(12) United States Patent
Basco de Rosa Payne et al.

(10) Patent No.: US 11,529,986 B2
(45) Date of Patent: Dec. 20, 2022

(54) BRAKE ASSEMBLY FOR ROBOTIC SURGERY SYSTEM

(71) Applicant: Titan Medical Inc., Toronto (CA)

(72) Inventors: Angelica Basco de Rosa Payne, Copley, OH (US); Spencer Scott Pratt, Cary, NC (US); Abraham Allen Shipley, Apex, NC (US); Hans Christian Pflaumer, Apex, NC (US)

(73) Assignee: Titan Medical Inc., Toronto (CA)

( * ) Notice: Subject to any disclaimer, the term of this patent is extended or adjusted under 35 U.S.C. 154(b) by 30 days.

(21) Appl. No.: 17/301,269

(22) Filed: Mar. 30, 2021

(65) Prior Publication Data

US 2021/0237789 A1 Aug. 5, 2021

Related U.S. Application Data

(63) Continuation of application No. 16/419,743, filed on May 22, 2019, now Pat. No. 10,988,158.

(51) Int. Cl.
*B62B 5/04* (2006.01)
*B62B 3/00* (2006.01)
(Continued)

(52) U.S. Cl.
CPC ........ *B62B 5/0433* (2013.01); *B60B 33/0092* (2013.01); *B62B 3/00* (2013.01); *B62B 5/04* (2013.01); *B62B 5/0461* (2013.01); *F16D 65/28* (2013.01); *B62B 2005/0471* (2013.01); *B62B 2202/00* (2013.01); *B62B 2301/044* (2013.01); *F16D 2121/04* (2013.01);
(Continued)

(58) Field of Classification Search
CPC ........... B62B 5/0433; B62B 3/00; B62B 5/04; B62B 5/0461; B62B 2005/0471; B62B 2202/00; B62B 2301/044; B60B 33/0092; F16D 65/28; F16D 2121/04; F16D 2121/14; F16D 2125/46; F16D 2125/64; F16D 55/2255
See application file for complete search history.

(56) References Cited

U.S. PATENT DOCUMENTS

| | | |
|---|---|---|
| 4,526,253 A | 7/1985 | Schmidt |
| 8,910,953 B2 | 12/2014 | Faulhaber |

(Continued)

*Primary Examiner* — Darlene P Condra
(74) *Attorney, Agent, or Firm* — Knobbe, Martens, Olson & Bear LLP

(57) ABSTRACT

A robotic surgery cart has a pair of rear wheel assemblies and a pair of front wheel assemblies. A brake assembly for the robotic surgery cart includes a gearbox interposed between and connected to the pair of rear wheel assemblies by rotatable shafts. Elongate actuators extend between and interconnect the rotatable shafts and brake mechanisms for the front wheel assemblies. A pedal lever is rotatably coupled to the gearbox and can rotate clockwise by pressing one portion of the pedal lever and can rotate counterclockwise by pressing another portion of the pedal lever. Rotation of the pedal lever causes the gearbox to rotate the rotatable shafts to substantially lock the pair of rear wheel assemblies, and substantially simultaneously causes a translation of the elongate actuators to actuate the brake mechanisms of the front wheel assemblies, such that the wheels of the front and rear wheel assemblies brake substantially simultaneously.

22 Claims, 10 Drawing Sheets

(51) Int. Cl.
    *B60B 33/00*       (2006.01)
    *F16D 65/28*       (2006.01)
    *F16D 121/14*     (2012.01)
    *F16D 121/04*     (2012.01)
    *F16D 125/64*     (2012.01)
    *F16D 125/46*     (2012.01)

(52) U.S. Cl.
    CPC ...... *F16D 2121/14* (2013.01); *F16D 2125/46* (2013.01); *F16D 2125/64* (2013.01)

(56) References Cited

U.S. PATENT DOCUMENTS

| | | | |
|---|---|---|---|
| 9,522,710 | B2 | 12/2016 | Constien |
| 9,579,241 | B2 | 2/2017 | Spoor |
| 10,988,158 | B2 * | 4/2021 | Basco de Rosa Payne ................ B62B 3/00 |
| 2002/0043777 | A1 | 4/2002 | Ireton |
| 2011/0247903 | A1 | 10/2011 | Boukhny |
| 2017/0065354 | A1 | 3/2017 | Shiels |
| 2020/0221624 | A1 | 7/2020 | Turner |

* cited by examiner

BRAKE ASSEMBLY FOR ROBOTIC SURGERY SYSTEM

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The present disclosure generally relates to robotic surgical systems, and more particularly to a brake assembly for a robotic surgical system.

Description of the Related Art

Robotic surgery systems generally include an operator interface that receives operator input from a surgeon and causes corresponding movements of surgical tools within a body cavity of a patient to perform a surgical procedure. The operator interface can be on a workstation that the surgeon interfaces with to perform a surgical procedure using the surgical tools. The surgical tools can be on a cart separate from the workstation. The cart can be mobile, allowing hospital staff to move the cart into an operating room prior to the surgical procedure, and to remove it from the operating room once the surgical procedure has been completed.

SUMMARY

In accordance with one aspect of the disclosure, a brake assembly is provided on a cart of a robotic surgery system. The brake system is actuatable by a user to lock and unlock all the wheels of the cart substantially simultaneously.

In accordance with another aspect of the disclosure, a brake assembly for a robotic surgery cart is provided. The brake assembly comprises a pair of rear wheel assemblies, each having a brake mechanism actuatable to selectively brake a wheel of each of the rear wheel assemblies, and a pair of front wheel assemblies, each having a disc brake assembly actuatable to selectively brake a rotor operatively coupled to a wheel of each of the front wheel assemblies. The brake assembly also comprises a gearbox interposed between the pair of rear wheel assemblies, a pair of rotatable shafts extending along a first axis and interconnecting the gearbox with the pair of rear wheel assemblies, and a pair of elongate actuators interconnecting the pair of rotatable shafts and the disc brake assemblies of the front wheel assemblies. The brake assembly also comprises a pedal lever rotatably coupled to the gearbox and configured to rotate about a second axis that is generally perpendicular to the first axis, the pedal lever configured to rotate clockwise by pressing on one portion of the pedal lever and to rotate counterclockwise by pressing on another portion of the pedal lever. Rotation of the pedal lever about the second axis causes the gearbox to rotate the pair of rotatable shafts about the first axis to substantially lock the pair of rear wheel assemblies, and substantially simultaneously causes a translation of the pair of elongate actuators to actuate the disc brake assemblies to substantially lock the rotors of the front wheel assemblies, such that the wheels of the front and rear wheel assemblies brake substantially simultaneously.

In accordance with another aspect of the disclosure, a brake assembly for a robotic surgery cart is provided. The brake assembly comprises a pair of rear wheel assemblies, each having a brake mechanism actuatable to selectively brake a wheel of the rear wheel assembly, at least one front wheel assembly, a rotor operatively coupled to a wheel of the at least one front wheel assembly, a disc brake assembly actuatable to selectively brake the rotor, and a gearbox interposed between the pair of rear wheels. The brake assembly also comprises a pair of rotatable shafts extending along a first axis and interconnecting the gearbox with the pair of rear wheels, and at least one elongate actuator interconnecting at least one of the pair of rotatable shafts and the disc brake assembly. The brake assembly also comprises a pedal lever rotatably coupled to the gearbox, the pedal lever configured to rotate in a first direction by pressing on one portion of the pedal lever and to rotate in a second direction by pressing on another portion of the pedal lever. Rotation of the pedal lever causes the gearbox to rotate the pair of rotatable shafts about the first axis to substantially lock the pair of rear wheel assemblies, and substantially simultaneously causes a translation of the at least one elongate actuator to actuate the disc brake assembly to substantially lock the rotor, such that the rear wheel assemblies and the at least one front wheel assembly brake substantially simultaneously.

DETAILED DESCRIPTION

Overview of Robotic Surgery System

Figure 1:
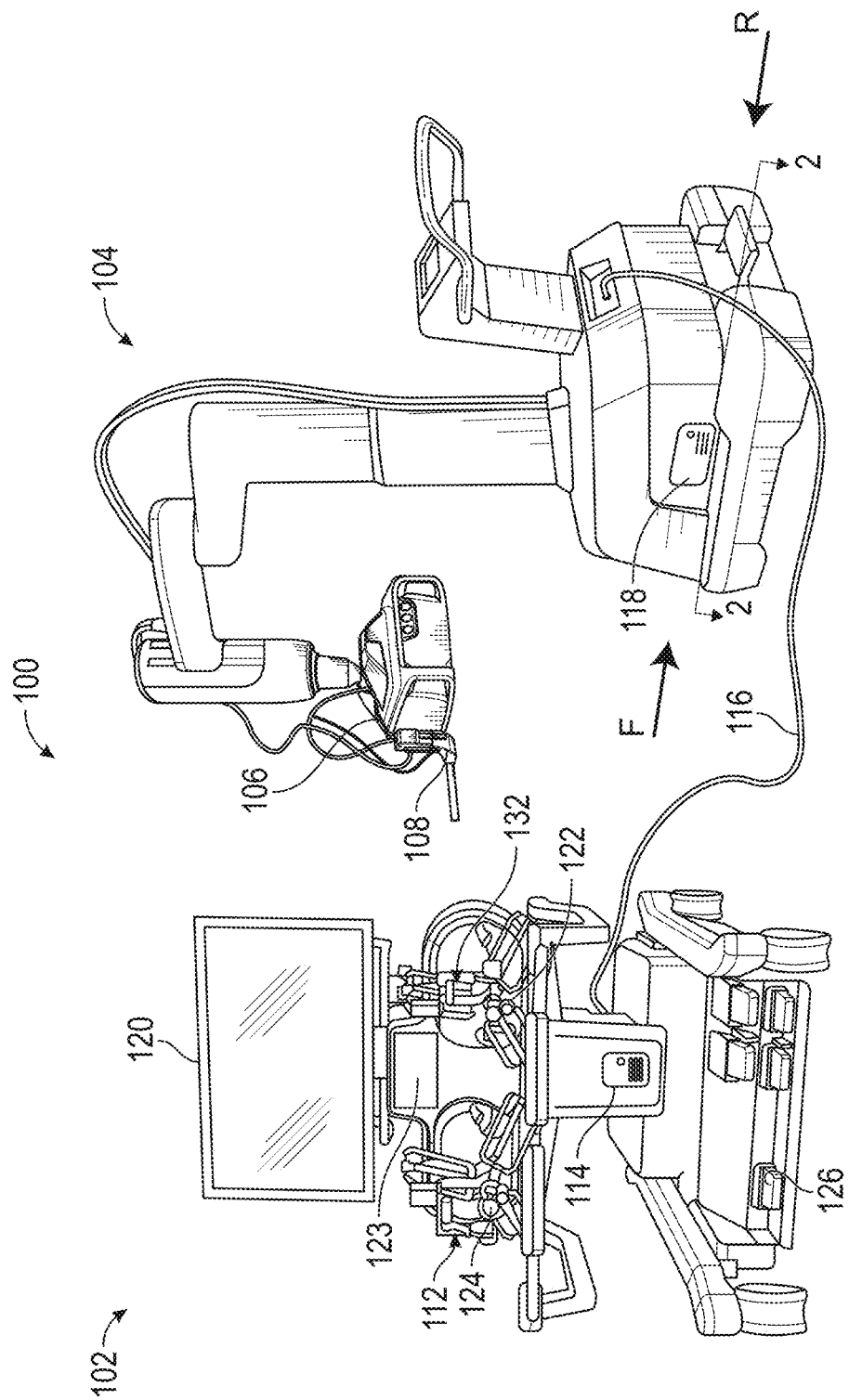
FIG. 1 illustrates a robotic surgery system.

FIG. 1 illustrates a robotic surgery system 100. The robotic surgery system 100 includes a workstation 102 and an instrument station or a patient cart 104. The patient cart 104 includes at least one tool mountable on a moveable instrument mount, central unit or drive unit 106 that houses an instrument drive (not shown) for manipulating the tool. The tool may include an insertion device 108 that can support at least one surgical instrument (hereinafter to be interchangeably used with an "instrument" or "surgical tool") and a camera (not shown) that images a surgical site. The workstation 102 may also include a tool such as an instrument clutch (that may optionally be implemented by a foot pedal described below). The insertion device 108 can optionally support two or more instruments (not shown). The camera may optionally include a primary camera and at least one secondary camera. The primary camera and the secondary camera may provide different viewing angles, perform different functions and/or produce different images. At least one of the primary camera and the secondary camera may optionally be a two-dimensional (2D) or a three-dimensional (3D) camera. FIG. 1 is merely an example of a robotic surgery system, and certain elements may be removed, other elements added, two or more elements combined, or one element can be separated into multiple elements depending on the specification and requirements of the robotic surgery system.

The workstation 102 includes an input device for use by a user (for example, a surgeon; hereinafter to be interchangeably used with an "operator") for controlling the instrument via the instrument drive to perform surgical operations on a patient. The input device may optionally be implemented using a haptic interface device available from Force Dimension, of Switzerland, for example. The input device optionally includes a right input device 132 and a left input device 112 for controlling respective right and left instruments (not shown). The right input device 132 includes a right hand controller 122 (hereinafter to be interchangeably used with a "hand grip" or "handpiece") and the left input device 112 includes a left hand controller 124. The right and left hand controllers 122 and 124 may optionally be mechanically or electrically coupled to the respective input devices 132 and 112. Alternatively, the right and left hand controllers 122 and 124 may be wirelessly coupled to the respective input devices 132 and 112 or may be wireless coupled directly to the workstation 102. In some cases, when there are two instruments at the instrument station 104, the right and left hand controllers 122 and 124 may respectively control the two instruments. In some cases, when there are more than two instruments, the right and left hand controllers 122 and 124 may be used to select two of the multiple instruments that an operator wishes to use. In some cases, when there is only one instrument, one of the right and left hand controllers 122 and 124 may be used to select the single instrument.

The input devices 132 and 112 may generate input signals representing positions of the hand controllers 122 and 124 within an input device workspace (not shown). In some cases where the input devices 132 and 112 are coupled directly and wirelessly to the workstation, they would include the necessary sensors to allow wireless control such as an accelerometer, a gyroscope and/or magnetometer. In other cases, a wireless connection of the input devices 132 and 112 to the workstation 102 may be accomplished by the use of camera systems alone or in combination with the described sensors. The afore described sensors for wireless functionality may also be placed in each handpiece to be used in conjunction with the input devices 132 and 112 to independently verify the input device data. The workstation 102 also includes a workstation processor circuit 114, which is in communication with the input devices 132 and 112 for receiving the input signals.

The workstation 102 also includes a display 120 in communication with the workstation processor circuit 114 for displaying real time images and/or other graphical depictions of a surgical site produced by the camera associated with the instrument. The workstation 102 may optionally include right and left graphical depictions (not shown) displayed on the display 120 respectively for the right and left side instruments (not shown). The graphical depictions may optionally be displayed at a peripheral region of the display 120 to prevent obscuring a live view of the surgical workspace also displayed on the display. The display 120 may further be operable to provide other visual feedback and/or instructions to the user. A second auxiliary display 123 may be utilized to display auxiliary surgical information to the user (surgeon), displaying, for example, patient medical charts and pre-operation images. In some cases, the auxiliary display 123 may be a touch display and may also be configured to display graphics representing additional inputs for controlling the workstation 102 and/or the patient cart 104. The workstation 102 further includes a footswitch or foot pedal 126, which is actuatable by the user to provide input signals to the workstation processor circuit 114. In one case, the signal provided to the workstation processor circuit 114 may inhibit movement of the instrument while the footswitch 126 is depressed.

The patient cart 104 includes an instrument processor circuit 118 for controlling the central unit 106, insertion device 108, one or more instruments and/or one or more cameras. In such case, the instrument processor circuit 118 is in communication with the workstation processor circuit 114 via an interface cable 116 for transmitting signals between the workstation processor circuit 114 and the instrument processor circuit 118. In some cases, communication between the workstation processor circuit 114 and the processor circuit 118 may be wireless or via a computer network, and the workstation 102 may even be located remotely from the instrument station 104. Input signals are generated by the right and left input devices 132 and 112 in response to movement of the hand controllers 122 and 124 by the user within the input device workspace and the instrument is spatially positioned in a surgical workspace in response to the input signals.

Additional details of the robotic surgery system 100 are described in U.S. patent application Ser. No. 16/174,646 filed on Oct. 30, 2018, the entirety of which is hereby incorporated by references and should be considered a part of this specification.

Braking Assembly

FIGS. 2A-9 illustrate a braking assembly 200, 200' for a mobile cart, such as an instrument station or the patient cart 104 of the robotic surgical system 100.

Figure 2A:
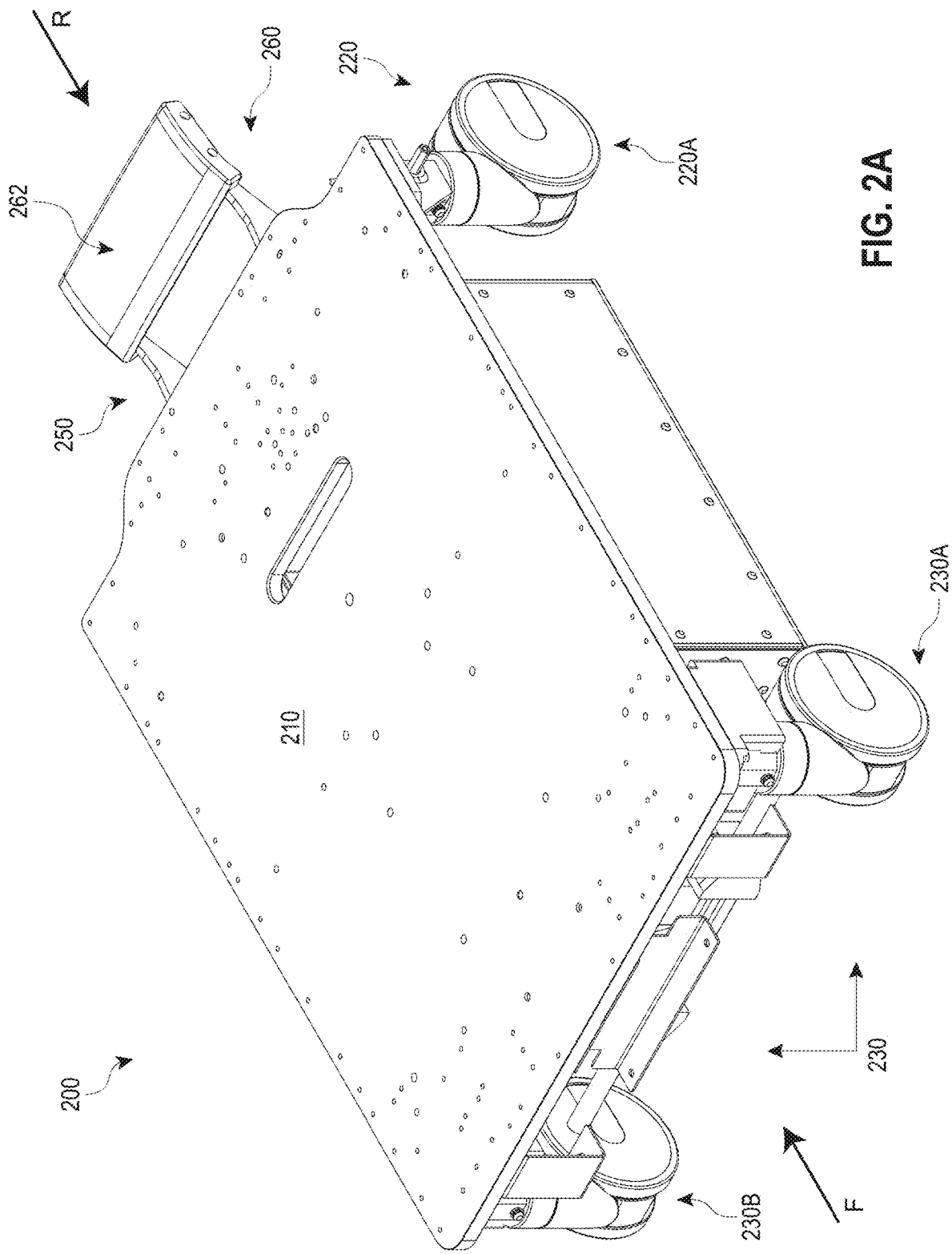
FIG. 2A is a front perspective view of a baseplate assembly of a cart of the robotic surgery system of FIG. 1 along plane 2-2.
Figure 2B:
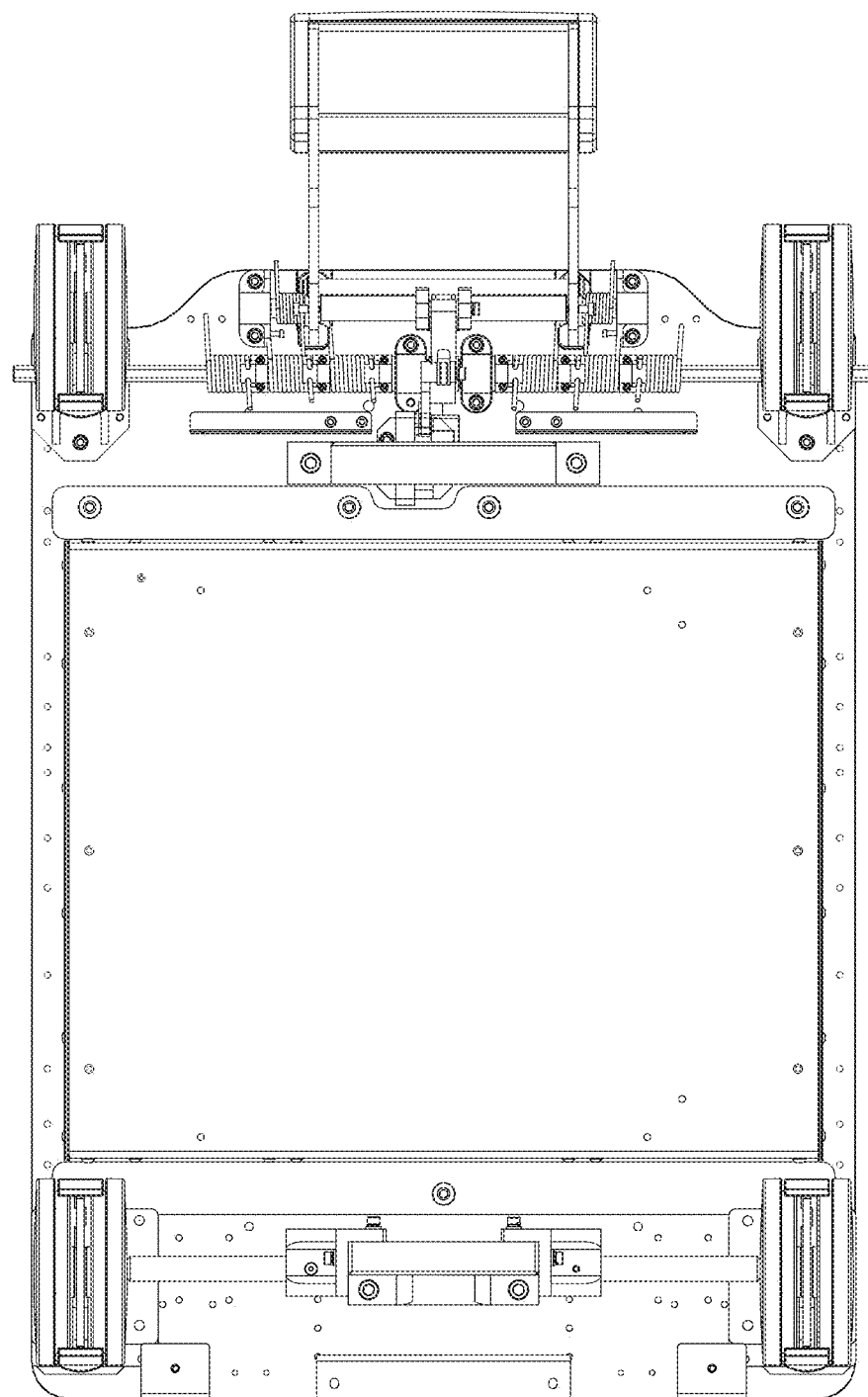
FIG. 2B is a bottom view of the baseplate assembly of FIG. 2.
Figure 3:
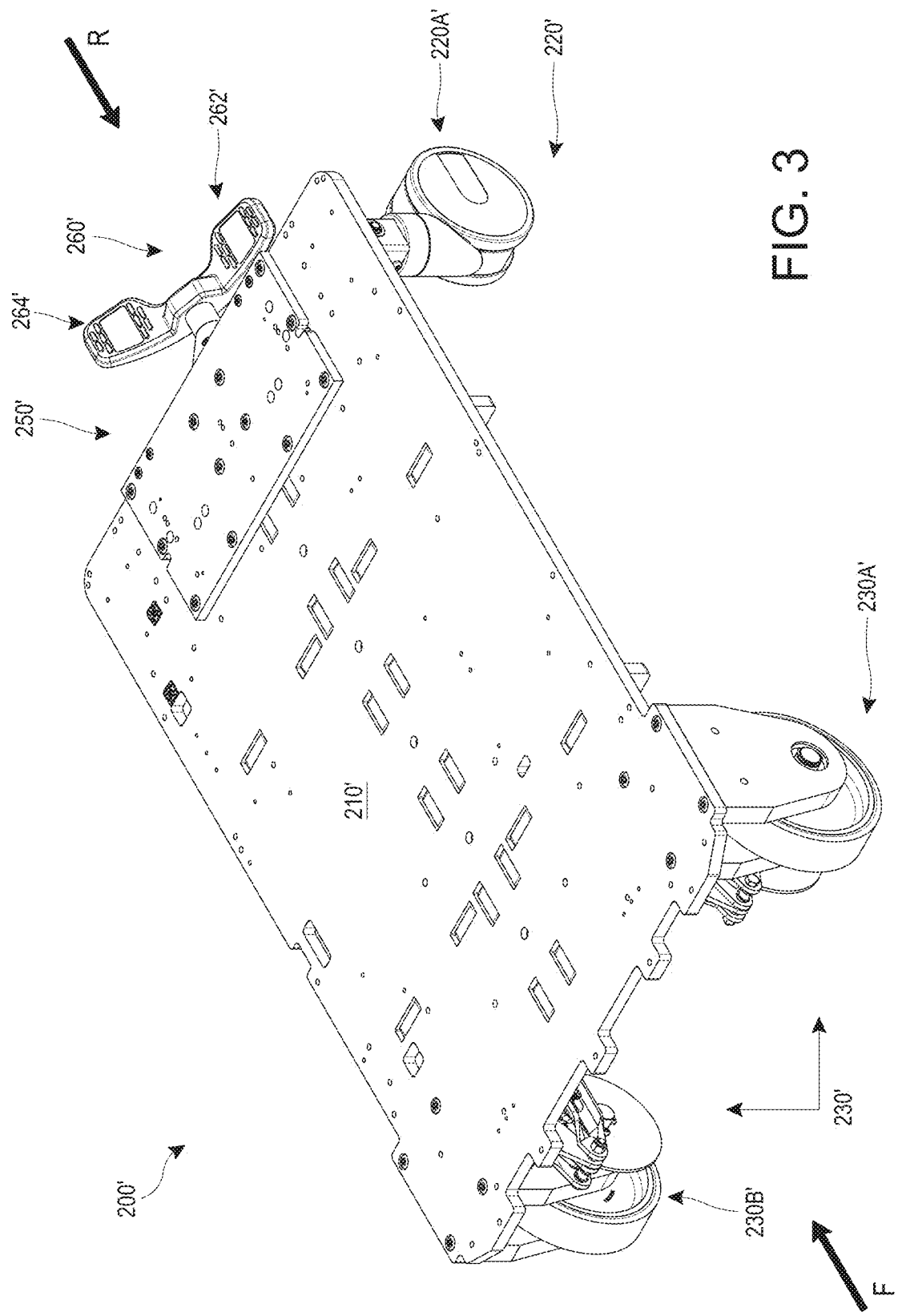
FIG. 3 is a front perspective view of another baseplate assembly for the cart of the robotic surgery system of FIG. 1.

FIGS. 2A-2B show a braking assembly 200 of the patient cart 104, that at least partially defines the bottom portion of the patient cart 104 taken along line 2-2 in FIG. 1. The braking assembly 200 can have a baseplate 210, a pair of rear wheel assemblies 220 (left rear wheel assembly 220A and right rear wheel assembly 220B), a pair or front wheel assemblies 230 (left front wheel assembly 230A and right front wheel assembly 230B), a gearbox assembly 250 and a pedal assembly 260. The rear wheel assemblies 220, front wheel assemblies 230 and gearbox assembly 250 can be attached to the baseplate 210 (e.g. to an underside of the base plate 210). Optionally, the pair of rear wheel assemblies 220 are casters 220A, 220B (not shown). Optionally, the pair of front wheel assemblies 230 are casters 230A, 230B. The pedal assembly 260 can have a depressible pedal 262 movably coupled to the gearbox assembly 250, and actuatable by an operator (e.g., by pressing on the pedal with their foot) to actuate the gearbox assembly 250 to lock and unlock the pair of rear and front wheel assemblies 220, 230 substantially simultaneously, as further discussed below. In one implementation, the pedal assembly 260 engages the gearbox assembly 250 in a push-push manner, such that pushing the pedal 262 down causes the gearbox assembly 250 to lock the pair of rear and front wheel assemblies 220, 230 (e.g., inhibit or prevent them from rotating), and pushing the pedal 262 down a second time causes the gearbox assembly 250 to unlock the pair of rear and front wheel assemblies 220, 230 (e.g., allowing them to rotate).

FIGS. 3-9 show a braking assembly 200' similar to the braking assembly 200 described above in connection with FIG. 2. Thus, references numerals used to designate the various components of the braking assembly 200' are identical to those used for identifying the corresponding components of the braking assembly 200 in FIG. 2, except that a "'" is added to the numerical identifier. Therefore, the structure and description for the various components of the braking assembly 200 in FIG. 2 is understood to also apply to the corresponding components of the braking assembly 200' in FIGS. 3-9, except as described below.

The braking assembly 200' differs from the braking assembly 200 in that at least a portion of the gearbox assembly 250' is mounted at least in part to a top surface 211A' of the baseplate 210'. Additionally, the pair of front wheel assemblies 230' are not casters. Further, the pedal assembly 260' is rotatably coupled to the gearbox 250' (See FIG. 7B). The pedal assembly 260' includes a first pedal 262' and a second pedal 264', where actuation of one of the pedals 262', 264' locks the pair of front and rear wheel assemblies 220', 230' substantially simultaneously to lock the braking assembly 200' and patient cart 104 in place, and actuation of the other of the pedals 262', 264' unlocks the pair of front and rear wheel assemblies 220', 230', allowing the braking assembly 200' and patient cart 104 to be moved. In one implementation, the rear wheel assemblies 220A', 220B' can be casters, such as casters from Tente International GmbH.

Figure 4:
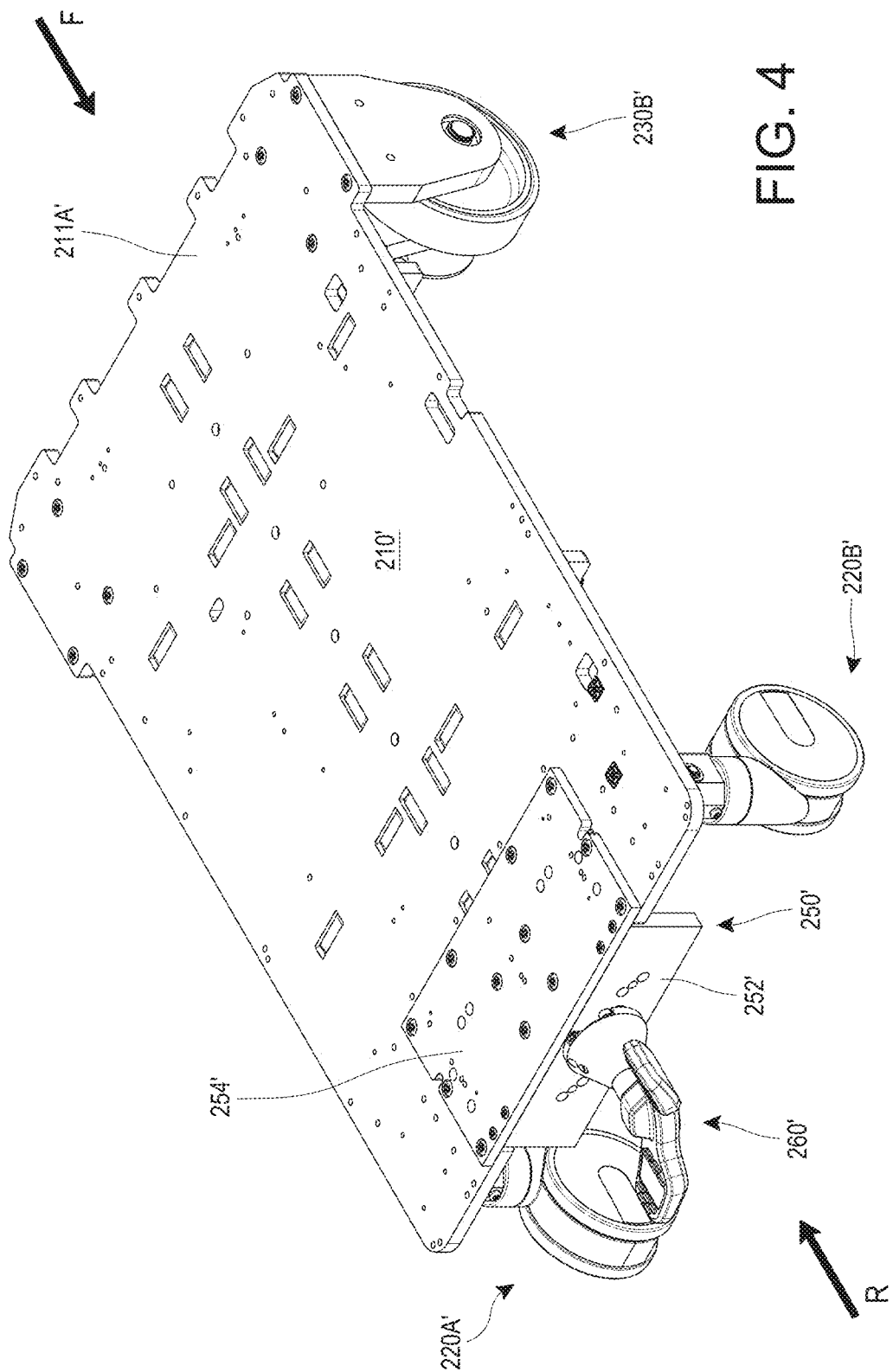
FIG. 4 is a rear perspective view of the baseplate assembly in FIG. 3.
Figure 5:
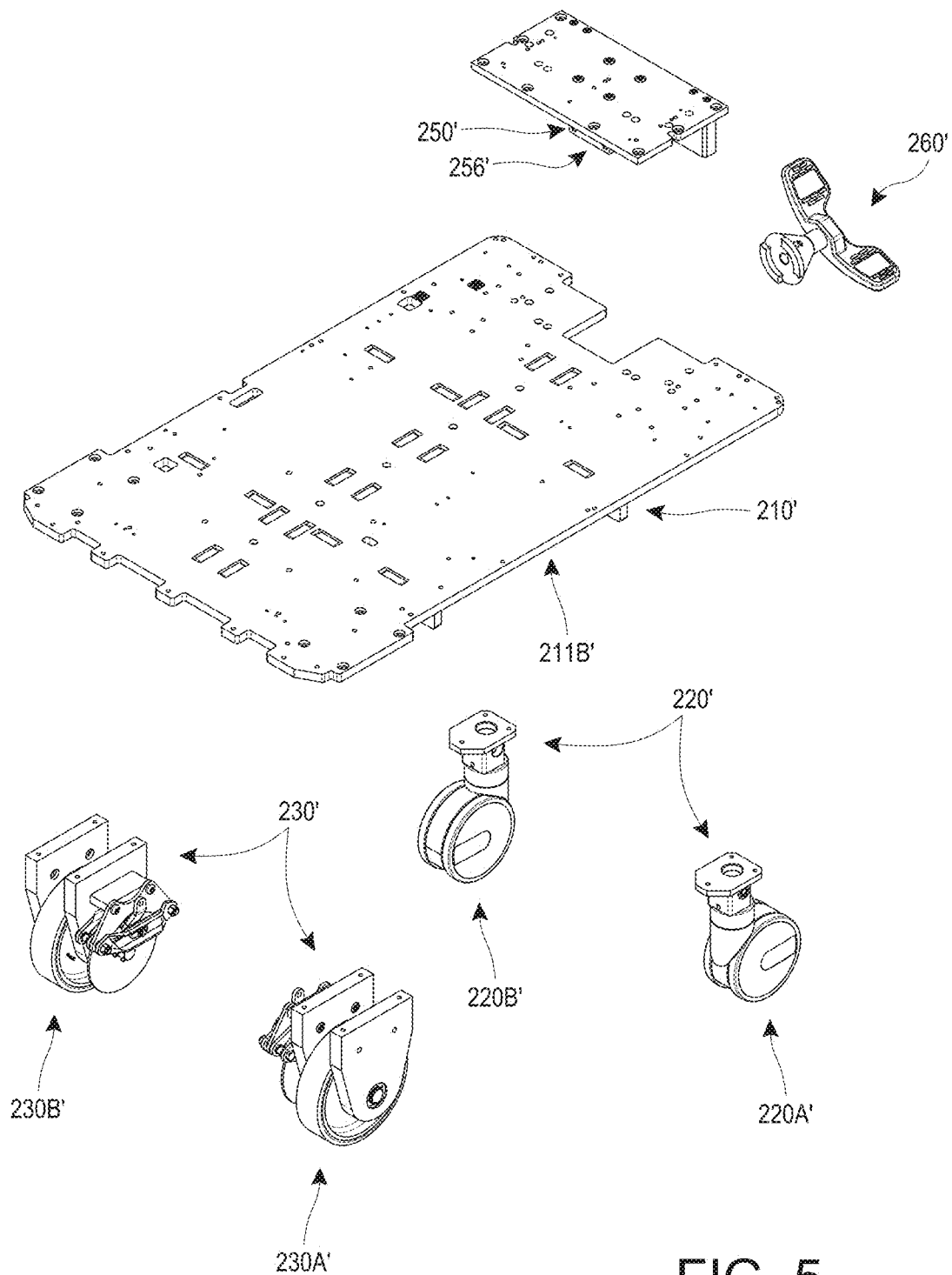
FIG. 5 is an exploded view of the baseplate assembly of FIG. 3.
Figure 6:
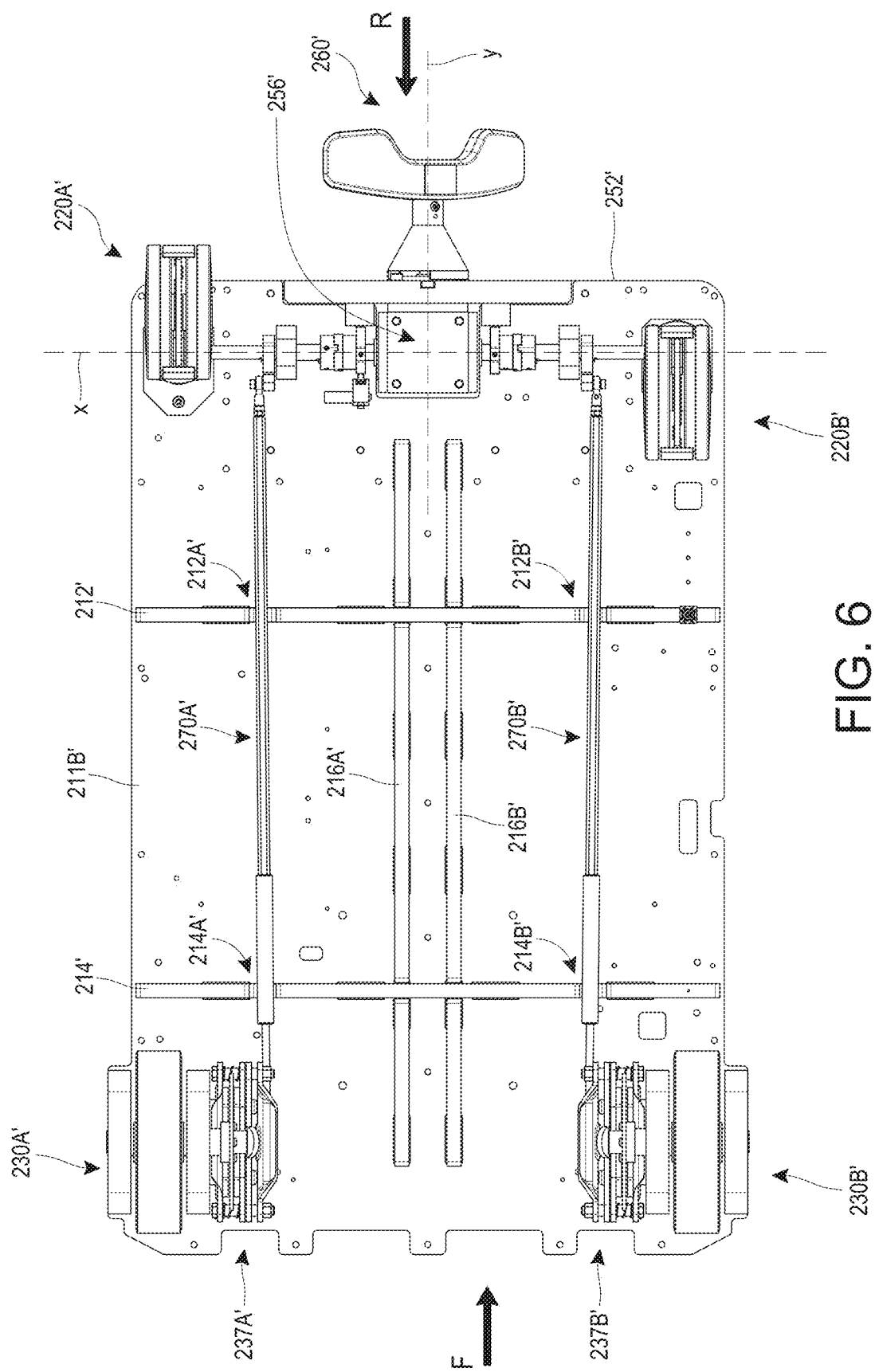
FIG. 6 is a bottom view of the baseplate assembly of FIG. 3.

With reference to FIGS. 4-6, the gearbox assembly 250' can optionally have a front mounting plate 252', a top mounting plate 254', where at least a portion of the front and top mounting plates 252', 254' attach to the baseplate 210', and a gearbox 256'. The gearbox 256' can be a right angle gearbox with an input shaft (not shown) that couples to the pedal assembly 260' and two output shafts (not shown) that extend generally perpendicular to the input shaft. The gearbox 256' can have one or more gears (e.g., bevel gears) that translate rotation of input shaft about an axis Y (via rotation of the pedal assembly 260') into rotation of the output shafts (not shown) of the gearbox 256' about an axis X that is perpendicular to the axis Y. Optionally, the two output shafts rotate in the same direction. The top mounting plate 254' can attach to a top surface 211A' of the base plate 210'. The gearbox 256' can optionally mount to one or both of a bottom surface 211B' of the base plate 210' and the top mounting plate 254'. The rear wheel assemblies 220A', 220B' can attach to the bottom surface 211B' of the base plate 210' via mounting plates 222A', 222B'. The front wheel assemblies 230A', 230B' can attach to the bottom surface 211B' of the base plate 210' via brackets 232A', 233A', 232B', 233B'.

Figure 7:
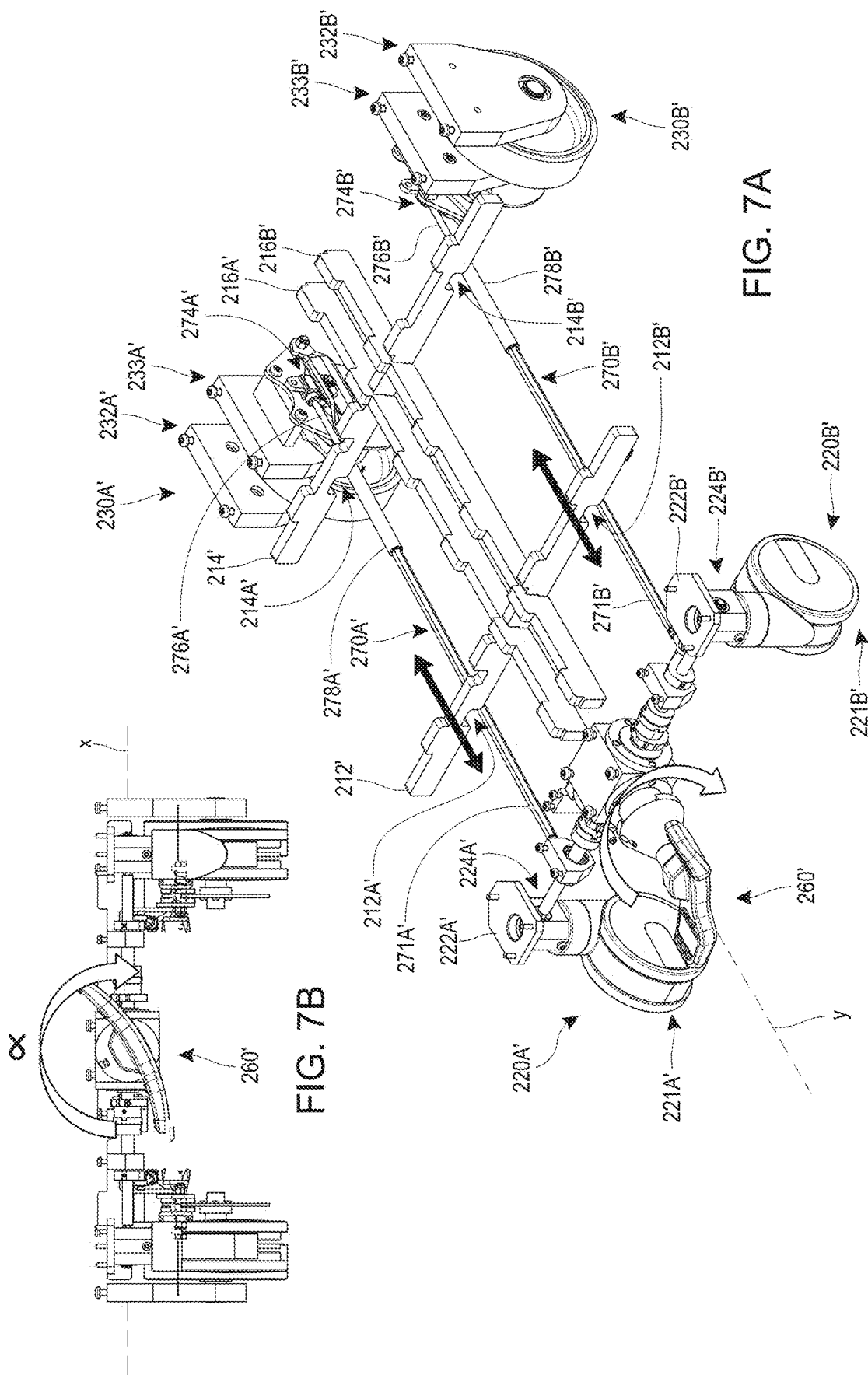
FIG. 7A is a perspective rear view of the brake assembly of the baseplate assembly of FIG. 3 with the baseplate removed.
FIG. 7B is a partial rear view of the brake assembly of the baseplate assembly of FIG. 3.
Figure 8:
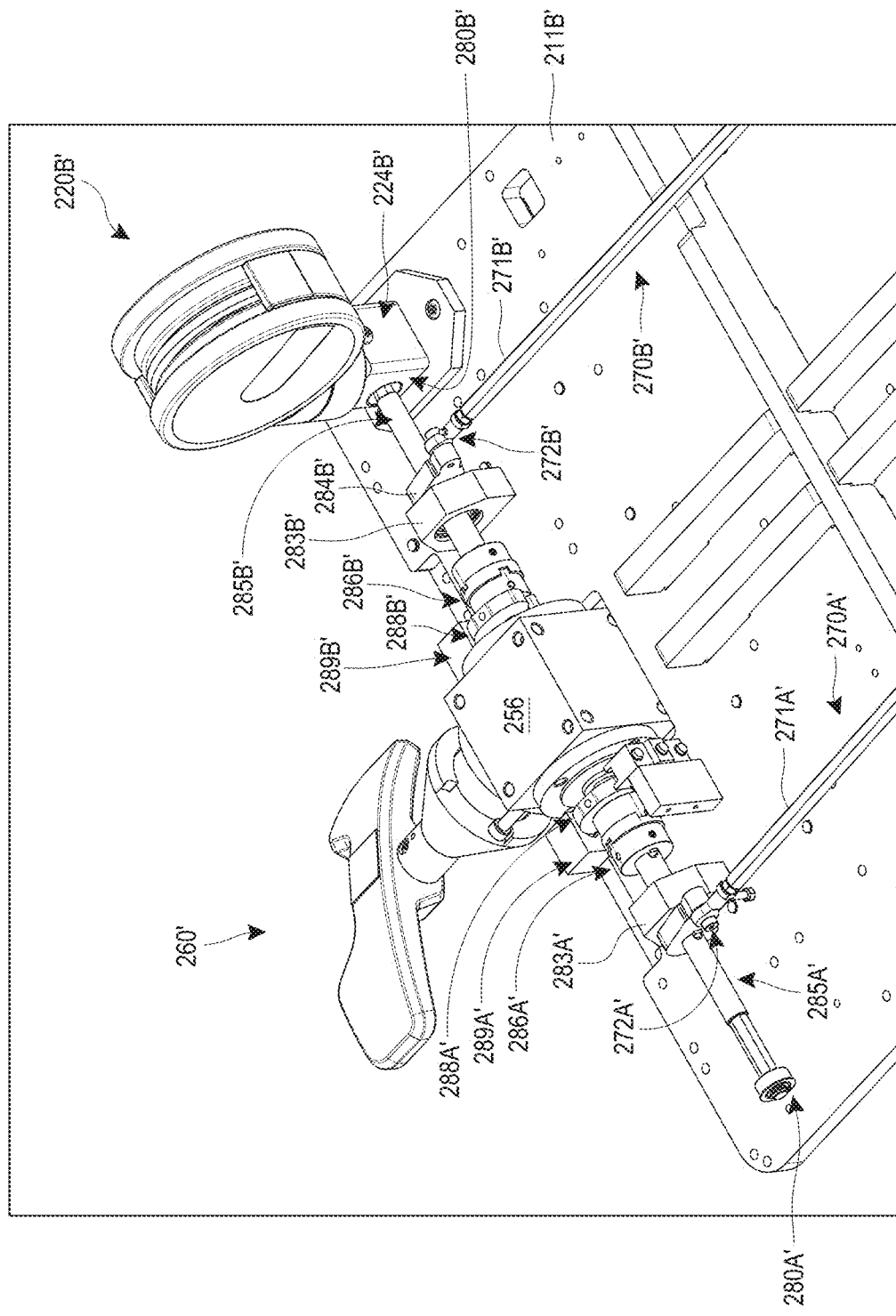
FIG. 8 is a partial perspective bottom view of the brake assembly attached to the baseplate of the baseplate assembly.

FIG. 6 shows a bottom view of the braking assembly 200', FIG. 7 shows the components of the braking assembly 200' with the baseplate 210' removed, and FIG. 8 shows a partially assembled view of the braking assembly 200'. With reference to FIGS. 6-8, the output shafts of the gearbox 256' engage with rotary detents 288A', 288B' on both sides of the gearbox 256', which selectively engage spring plungers 289A', 289B' as they rotate, as discussed further below. The rotary detents 288A', 288B' couple with shaft couplings 286A', 286B', which in turn couple with shaft portions 285A', 285B' that extend to shaft ends 280A', 280B'. The shaft ends 280A', 280B' can optionally extend into housings 224A', 224B' of the rear wheel assemblies 220A', 220B'. The shaft ends 280A', 280B' optionally have a portion (e.g., keyed portion) that engages a break mechanism in the rear wheel assemblies 220A', 220B'. Rotation of the pedal assembly 260' in one direction causes the shaft portions 285A', 285B', and therefore the shaft ends 280A', 280B' to rotate in a first direction (via the gearbox 256), causing the brake mechanism in the front wheel assemblies 220A', 220B' to engage at least a portion of the wheels 221A', 221B' of the front wheel assemblies 220A', 220B'. In another implementation, the rotary detents 288A', 288B' and spring plungers 289A', 289B' are excluded.

With continued reference to FIGS. 6-8, the shaft portions 285A', 285B' can extend through brackets 283A', 283B' that are attached to the bottom surface 211B' of the baseplate 210'. Optionally, the brackets 283A', 283B' can each include a bushing through which the shaft portions 285A', 285B' extend. The brackets 283A', 283B' can support the shaft portions 285A', 285B' on the braking assembly 200'. A pair of levers 284A', 284B' can be mounted (e.g., via press-fit connection, rigidly mounted) on the shaft portions 285A', 285B', respectively. The levers 284A', 284B' rotate with the shaft portions 285A', 285B'.

One or more elongate actuators operatively interconnect the pair of front wheel assemblies 220' and the pair of front wheel assemblies 230'. In FIGS. 6-8, a pair of elongate actuators 270A', 270B' operatively interconnect the pair of front wheel assemblies and the pair of rear wheel assemblies 230'. The pair of actuators 270A', 270B' can have linkages 272A', 272B' at an end thereof (e.g., removably attached to an end thereof) that couples to the levers 284A', 284B'. The pair of actuators 270A', 270B' can have linkage 274A', 274B' at an opposite end thereof (e.g., removably attached to the opposite end thereof) that couples to a disk brake assembly 237A', 237B' of the front wheel assemblies 230A', 230B' as further described below.

In one implementation, the pair of actuators 270A', 270B' are a pair of gas springs. In one implementation, the elongate actuators 270A', 270B' are gas springs for medical applications provided by Industrial Gas Springs, Inc. The elongate actuators 270A', 270B' optionally include shaft portions 271A', 271B' that attach to the levers 284A', 284B' via linkages 272A', 272B', cylinder portions 274A', 274B' attached to the shaft portions 272A', 272B', and piston rod portions 276A', 276B' that travel within the cylinder portions 278A', 278B' and that couple to the front wheel assemblies 230A', 230B' via the linkages 274A', 274B'. In other implementations, the one or more actuators are a pair of rods (e.g., substantially rigid rods) that extend (continuously) from the linkages 272A', 272B' to the linkages 274A', 274B'. In other implementations, the one or more actuators are a pair of compression springs that extend from the linkages 272A', 272B' to the linkages 274A', 274B'. In other implementations, the one or more actuators are a pair of extension springs that extend from the linkages 272A', 272B' to the linkages 274A', 274B'.

The braking assembly 200' can include a one or more support rails attached to the baseplate 210'. As shown in FIGS. 6 and 7A, the braking assembly 200' can optionally have one or more (e.g., a pair of) longitudinal rails 216A', 216B' attached to the bottom surface 211B' of the baseplate 210'. One or more (e.g., a pair of) transverse rails 212', 214' can attach to one or both of the longitudinal rail(s) 216A', 216B' and the bottom surface 211B' of the baseplate 210'. The transverse rail(s) 212', 214' optionally have slots 212A', 212B', 214A', 214B' through which at least a portion of the elongate actuator(s) 270A', 270B' extend. The slots 212A', 212B', 214A', 214B' can aid in guiding the movement of the elongate actuator(s) 270A', 270B' as further discussed below.

Figure 9:
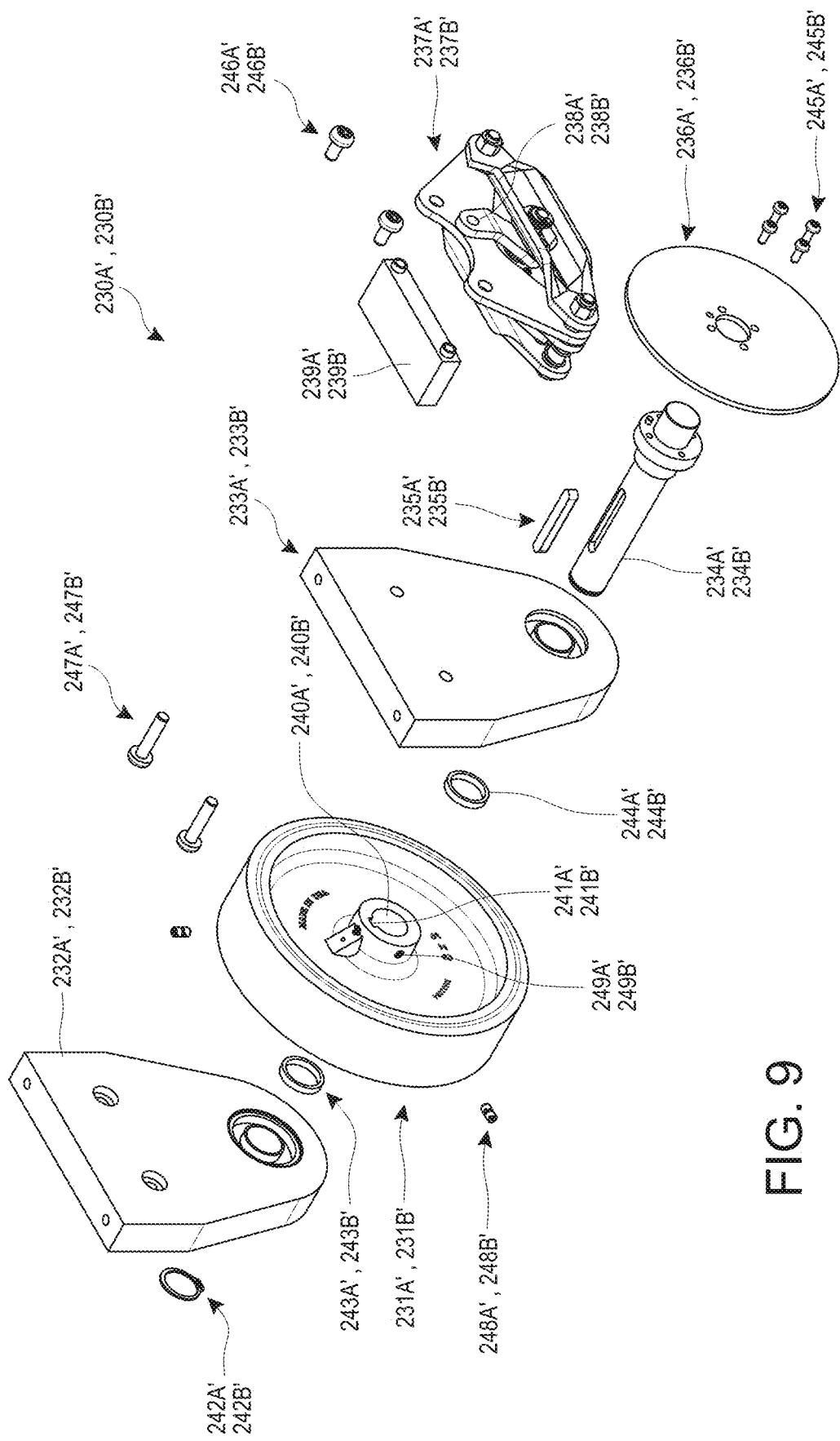
FIG. 9 is an exploded view of a front wheel of the cart, showing a portion of the brake assembly of the base plate assembly.

FIG. 9 shows an exploded view of the left front wheel assembly 230A'. The right front wheel assembly 230B' can have the same components and arrangements shown in FIG. 9 and described below, except that "B" would replace "A" in the numerical identifiers.

The front wheel assembly 230A', 230B' includes a wheel 231A', 231B' mounted between the outer bracket 232A', 232A' and inner bracket 233A', 233B' with an axle 234A', 234B' that extends through the wheel 231A', 231B'. The axle 234A', 234B' can have a recess or slot that couples with a key member 235A', 235B'. The key member 235A', 235B' can engage a key slot 241A', 241B' in a central opening 240A', 240B' of the wheel 231A', 231B' so that the wheel 231A', 231B' and axle 234A', 234B' rotate as one unit (e.g., the wheel 231A', 231B' does not rotate independently of the axle 234A', 234B'). An end of the axle 234A', 234B' can fixedly couple with a rotor 236A', 236B' rotate as one unit (e.g., the axle 234A', 234B' does not rotate independently of the rotor 236A', 236B').

A disc brake assembly 237A', 237B' can be disposed about at least a portion of the rotor 236A', 236B' and selectively actuatable to engage the rotor 236A', 236B' to brake (e.g., inhibit or prevent the rotation of) the rotor 236A', 236B'. In one implementation, the disc brake assembly 237A', 237B' can apply a force (e.g., a clamp force) of approximately up to about 900 lbf on the rotor 236A', 236B'. The disk brake assembly 237A', 237B' can have a lever 238A', 238B' that can couple with the linkage 274A', 274B' of the elongate actuator 270A', 270B'. The disc brake assembly 237A', 237B' can optionally couple to the bracket 233A', 233B' (e.g., via a spacer 239A', 239B' and fasteners 246A', 246B' and 247A', 247B', which can be screws).

Optionally, a locking ring 242A', 242B' can be coupled to an end of the axle 234A', 234B' to inhibit (e.g., prevent) the axle 234A', 234B' from sliding out of the wheel 231A', 231B'. Optionally, a set screw 248A', 248B' can be inserted in an opening 249A', 249B' of the wheel 231A', 231B' to aid in retaining the axle 234A', 234B' fixedly coupled to the wheel 231A', 231B'. Optionally, bearings 243A', 243B' and 244A', 244B' can be coupled to the axle 234A', 234B' and disposed in the brackets 232A', 232B' and 233A', 233B' to facilitate rotation of the axle 234A', 234B' within the brackets 232A', 232B' and 233A', 233B'. In one implementation, the front wheels 231A', 231B' are similar to ones supplied by TREW Industrial Wheels, Inc. In one implementation, the disc brake assemblies 237A', 237B' can be mechanical brakes, such as model 1100m provided by Hayes Performance Systems.

In operation, the pedal assembly 260' can rotate about axis Y by at least α degrees. In one implementation, α is between 0 degrees and 90 degrees, such as about 60 degrees. Optionally, rotation of the pedal assembly 260' in one direction (e.g., a counterclockwise direction by pressing on pedal 262') causes the wheel assemblies 220A', 220B', 230A', 230B' to lock to inhibit (e.g., prevent) motion of the baseplate 210', and rotation of the pedal assembly 260' in an opposite direction (e.g., a clockwise direction by pressing on pedal 264') causes the wheel assemblies 220A', 220B', 230A', 230B' to unlock and allow motion of the baseplate 210'. In another implementation, rotation of the pedal assembly 260' away from a neutral or level position (e.g., rotation clockwise or counterclockwise away from a neutral position) where the pedals 262', 264' are generally at the same orientation relative to the baseplate 210' causes the wheel assemblies 220A', 220B', 230A', 230B' to lock to inhibit (e.g., prevent) motion of the baseplate 210', and rotation of the pedal assembly 260' to the neutral or level position causes the wheel assemblies 220A', 220B', 230A', 230B' to unlock and allow motion of the baseplate 210'.

In operation, when the pedal assembly 260' is rotated to lock the rear and front pair of wheel assemblies 220', 230', the gearbox 256' translates rotation of the pedal assembly 260' into rotation (e.g., simultaneous rotation) of the shaft portions 285A', 285B' and shaft ends 280A', 280B'. Rotation of the shaft ends 280A', 280B' cause the brake mechanisms in the rear wheel assemblies 220A', 220B' to engage to inhibit (e.g., prevent) rotation of the rear wheel assemblies 220A', 220B'. Rotation of the shaft portions 285A', 285B' cause rotation (e.g., simultaneous rotation) of the levers 284A', 284B', which push (via the linkages 272A', 272B') the elongate actuators 270A', 270B' axially toward a front end F of the baseplate 210'. This results in the elongate actuators 270A', 270B' axially moving toward the front end F of the baseplate 210' so that the linkages 274A', 274B' push the levers 238A', 238B' causing the disc brake assemblies 237A', 237B' to engage the rotors 235A', 235B' to inhibit (e.g., prevent) rotation of the rotors 235A', 235B'. As the front wheels 231A', 231B', axles 234A', 234B' and rotors 235A', 235B' so that they rotate as one (e.g., they do not rotate independently of each other), the braking of the rotors 235A', 235B' with the disc brake assemblies 237A', 237B' also causes (e.g., simultaneously causes) the wheels 231A', 231B' to lock. Advantageously, the rear wheels 220A', 220B' and the front wheels 230A', 230B' lock substantially simultaneously upon rotation of the pedal assembly 260' to the locking orientation. Therefore, all the wheel assemblies 220A', 220B', 230A', 230B' of the braking assembly 200' (and therefor of a mobile cart, such as the patient cart 104) can be locked with a single actuation of the pedal assembly 260', making the locking and unlocking of the mobile cart (e.g., patient cart 104) simple and efficient.

As the shaft portions 285A', 285B' rotate to cause the wheel assemblies 220A', 220B', 230A', 230B' to lock, the rotary detents 288A', 288B' are rotated so that they engage the spring plungers 289A', 289B'. The spring plungers 289A', 289B' can resiliently hold the position of the rotary detents 288A', 288B' by exerting a force on the rotary detents 288A', 288B', and therefore the shaft portions 285A', 285B' to counteract any counteracting force (e.g. due to rotational inertia in the gearbox 256') that may cause the inadvertent backdriving of the gearbox 256' and/or pedal assembly 260' and cause the wheel assemblies 220A', 220B', 230A', 230B' from inadvertently unlocking once the operator has actuated the pedal assembly 260' to lock them.

In another implementation, the pair of elongate actuators 270A', 270B' can instead be replaced by a single elongate actuation. Additionally, the axles 234A', 234B' of the front wheel assemblies 230A', 230B' can instead be replaced by a single axle that extends through and is coupled (e.g., via a key and key slot arrangement as shown in FIG. 9) to both wheels 231A', 231B'. The two disc brake assemblies 237A', 237B' can instead be replaced by a single disc break assembly mounted to the bottom surface 211B' of the baseplate 210'. The two rotors 236A', 236B' can instead by replaced by a single rotor that is fixedly coupled to the axle (e.g., via a key and key-slot arrangement). The single elongate actuator would extend between and couple to a lever attached to the shaft portions 285A', 285B' and to a lever of the disc brake assembly. The single elongate actuator would operate in the same manner described above for the elongate actuators 270A', 270B' to lock the front wheel assemblies 230A', 230B' substantially simultaneously with the locking of the rear wheel assemblies 220A', 220B'.

Advantageously, the braking assembly 200, 200' allow all wheels 220A', 220B', 230A', 230B' to be locked and unlocked substantially simultaneously via actuation of the pedal assembly 260' (e.g., a single pedal assembly) by the operator. The braking of the wheels 220A', 220B', 230A', 230B' advantageously inhibit (e.g., prevent) motion of the mobile cart, such as the patient cart 104, in which it is incorporated, along a surface having an incline of up to about 10 degrees.

Additional Embodiments

In embodiments of the present invention, a brake assembly for a robotic surgery cart may be in accordance with any of the following clauses:

Clause 1. A brake assembly for a robotic surgery cart, comprising:
- a pair of rear wheel assemblies, each having a brake mechanism actuatable to selectively brake a wheel of each of the rear wheel assemblies;
- a pair of front wheel assemblies, each having a disc brake assembly actuatable to selectively brake a rotor operatively coupled to a wheel of each of the front wheel assemblies;
- a gearbox interposed between the pair of rear wheel assemblies;
- a pair of rotatable shafts extending along a first axis and interconnecting the gearbox with the pair of rear wheel assemblies;
- a pair of elongate actuators interconnecting the pair of rotatable shafts and the disc brake assemblies of the front wheel assemblies; and
- a pedal lever rotatably coupled to the gearbox and configured to rotate about a second axis that is generally perpendicular to the first axis, the pedal lever having a pair of pedals disposed on opposite sides of the second axis, allowing the pedal lever to rotate clockwise by pressing on one of the pair of pedals and to rotate counterclockwise by pressing on the other of the pair of pedals,
- wherein rotation of the pedal lever about the second axis causes the gearbox to rotate the pair of rotatable shafts about the first axis to substantially lock the pair of rear wheel assemblies, and substantially simultaneously causes a translation of the pair of elongate actuators to actuate the disc brake assemblies to substantially lock the rotors of the front wheel assemblies, such that the wheels of the front and rear wheel assemblies brake substantially simultaneously.

Clause 2. The brake assembly of clause 1, wherein the pair of rear wheel assemblies are casters.

Clause 3. The brake assembly of any preceding clause, wherein the pair of elongate actuators are gas springs.

Clause 4. The brake assembly of any preceding clause, wherein for each of the front wheel assemblies, the rotor is coupled to the wheel by an axle that is rotatably fixed relative to the wheel and the rotor.

Clause 5. The brake assembly of any preceding clause, wherein each of the pair of elongate actuators couples to one of the pair of rotatable shafts via a linkage movably coupled to a lever that is rotatably fixed to the rotatable shaft.

Clause 6. The brake assembly of any preceding clause, wherein each of the pair of elongate actuators couples to one of the disc brake assemblies via a linkage coupled to a movable lever of the disc brake assembly, wherein the lever is movable by the elongate actuator between a first position where the disc brake assembly does not inhibit rotation of the rotor and a second position where the disc brake assembly applies a braking force on the rotor.

Clause 7. The brake assembly of any preceding clause, further comprising a pair of rotary detents disposed on opposite sides of the gearbox, the rotary detents configured to engage a spring assembly to exert a force on the rotatable shafts to inhibit their rotation unless the pedal lever is actuated.

Clause 8. The brake assembly of any preceding clause, wherein the pedal lever is configured to rotate over a range of approximately 60 degrees.

Clause 9. The brake assembly of any preceding clause, further comprising a baseplate configured to support the pair of rear wheel assemblies, the pair of front wheel assemblies, and the gearbox.

Clause 10. A brake assembly for a robotic surgery cart, comprising:
- a pair of rear wheel assemblies, each having a brake mechanism actuatable to selectively brake a wheel of the rear wheel assembly;
- at least one front wheel assembly;
- a rotor operatively coupled to a wheel of the at least one front wheel assembly;
- a disc brake assembly actuatable to selectively brake the rotor;
- a gearbox interposed between the pair of rear wheels;
- a pair of rotatable shafts extending along a first axis and interconnecting the gearbox with the pair of rear wheels;
- at least one elongate actuator interconnecting at least one of the pair of rotatable shafts and the disc brake assembly; and
- a pedal lever rotatably coupled to the gearbox and configured to rotate about a second axis that is generally perpendicular to the first axis, the pedal lever configured to rotate in a first direction by pressing on one portion of the pedal lever and to rotate in a second direction by pressing on another portion of the pedal lever,
- wherein rotation of the pedal lever about the second axis causes the gearbox to rotate the pair of rotatable shafts about the first axis to substantially lock the pair of rear wheel assemblies, and substantially simultaneously causes a translation of the at least one elongate actuator to actuate the disc brake assembly to substantially lock the rotor, such that the rear wheel assemblies and the at least one front wheel assembly brake substantially simultaneously.

Clause 11. The brake assembly of clause 10, wherein the pair of rear wheel assemblies are casters.

Clause 12. The brake assembly of any of clauses 10-11, wherein the at least one elongate actuator is a pair of elongate actuators that extend between and interconnect the pair of rotatable shafts and a pair of disc brake assemblies.

Clause 13. The brake assembly of any of clauses 10-12, wherein the at least one elongate actuator is a gas spring.

Clause 14. The brake assembly of any of clauses 10-13, wherein the rotor is coupled to the wheel by an axle that is rotatably fixed relative to the wheel and the rotor.

Clause 15. The brake assembly of any of clauses 10-14, wherein the at least one elongate actuator couples to one of the pair of rotatable shafts via a linkage movably coupled to a lever that is rotatably fixed to the rotatable shaft.

Clause 16. The brake assembly of any of clauses 10-15, wherein the at least one elongate actuator couples to the disc brake assembly via a linkage coupled to a movable lever of the disc brake assembly, wherein the lever is movable by the elongate actuator between a first position where the disc brake assembly does not inhibit rotation of the rotor and a second position where the disc brake assembly applies a braking force on the rotor.

Clause 17. The brake assembly of any of clauses 10-16, further comprising a pair of rotary detents disposed on opposite sides of the gearbox, the rotary detents configured to engage a spring assembly to exert a force on the rotatable shafts to inhibit their rotation unless the pedal lever is actuated.

Clause 18. The brake assembly of any of clauses 10-17, wherein the pedal lever is configured to rotate over a range of approximately 60 degrees.

Other Variations

Those skilled in the art will appreciate that, in some embodiments, additional components and/or steps can be utilized, and disclosed components and/or steps can be combined or omitted. For example, although some embodiments are described in connection with a robotic surgery system, the disclosure is not so limited. Systems, devices, and methods described herein can be applicable to medical procedures in general, among other uses. As another example, certain components can be illustrated and/or described as being circular or cylindrical. In some implementations, the components can be additionally or alternatively include non-circular portions, such as portions having straight lines. As yet another example, any of the actuators described herein can include one or more motors, such as electrical motors. As yet another example, in addition to or instead of controlling tilt and/or pan of a camera, roll (or spin) can be controlled. For example, one or more actuators can be provided for controlling the spin.

The foregoing description details certain embodiments of the systems, devices, and methods disclosed herein. It will be appreciated, however, that no matter how detailed the foregoing appears in text, the systems, devices, and methods can be practiced in many ways. The use of particular terminology when describing certain features or aspects of the disclosure should not be taken to imply that the terminology is being redefined herein to be restricted to including any specific characteristics of the features or aspects of the technology with which that terminology is associated.

It will be appreciated by those skilled in the art that various modifications and changes can be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the figures can be combined, interchanged, or excluded from other embodiments.

With respect to the use of substantially any plural and/or singular terms herein, those having skill in the art can translate from the plural to the singular and/or from the singular to the plural as is appropriate to the context and/or application. The various singular/plural permutations can be expressly set forth herein for sake of clarity.

Directional terms used herein (for example, top, bottom, side, up, down, inward, outward, etc.) are generally used with reference to the orientation or perspective shown in the figures and are not intended to be limiting. For example, positioning "above" described herein can refer to positioning below or on one of sides. Thus, features described as being "above" may be included below, on one of sides, or the like.

It will be understood by those within the art that, in general, terms used herein are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims can contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (for example, the bare recitation of "two recitations," without other modifiers, typically means at least two recitations, or two or more recitations).

The term "comprising" as used herein is synonymous with "including," "containing," or "characterized by," and is inclusive or open-ended and does not exclude additional, unrecited elements or method steps.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Language of degree used herein, such as the terms "approximately," "about," "generally," and "substantially" as used herein represent a value, amount, or characteristic close to the stated value, amount, or characteristic that still performs a desired function and/or achieves a desired result. For example, the terms "approximately", "about", "generally," and "substantially" may refer to an amount that is within less than 10% of, within less than 5% of, within less than 1% of, within less than 0.1% of, and/or within less than 0.01% of the stated amount.

It will be further understood by those within the art that any disjunctive word and/or phrase presenting two or more alternative terms, whether in the description, claims, or drawings, can be understood to contemplate the possibilities of including one of the terms, either of the terms, or both terms. For example, the phrase "A or B" will be understood to include the possibilities of "A" or "B" or "A and B." Further, the term "each," as used herein, in addition to having its ordinary meaning, can mean any subset of a set of elements to which the term "each" is applied.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the invention.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

The above description discloses embodiments of systems, apparatuses, devices, methods, and materials of the present disclosure. This disclosure is susceptible to modifications in the components, parts, elements, steps, and materials, as well as alterations in the fabrication methods and equipment. Such modifications will become apparent to those skilled in the art from a consideration of this disclosure or practice of the disclosure. Consequently, it is not intended that the disclosure be limited to the specific embodiments disclosed herein, but that it cover all modifications and alternatives coming within the scope and spirit of the subject matter embodied in the following claims.

What is claimed is:

1. A brake assembly for a robotic surgery cart, comprising:
    a pair of rear wheel assemblies, each having a brake mechanism actuatable to selectively brake a wheel of each of the rear wheel assemblies;
    a pair of front wheel assemblies, each having a brake assembly actuatable to selectively brake a wheel of each of the front wheel assemblies;
    a gearbox interposed between the pair of rear wheel assemblies;
    a pair of rotatable shafts extending along a first axis and interconnecting the gearbox with the pair of rear wheel assemblies;
    a pair of actuators interconnecting the pair of rotatable shafts and the brake assemblies of the front wheel assemblies; and
    a pedal lever rotatably coupled to the gearbox and configured to rotate about a second axis different than the first axis, the pedal lever configured to rotate in a first direction about the second axis and to rotate in an opposite second direction about the second axis,
    wherein rotation of the pedal lever in one of the first and second directions about the second axis causes the gearbox to rotate the pair of rotatable shafts about the first axis to substantially lock the pair of rear wheel assemblies, and substantially simultaneously causes a translation of at least a portion of the pair of actuators to actuate the brake assemblies to substantially lock the front wheel assemblies, such that the wheels of the front and rear wheel assemblies brake substantially simultaneously.

2. The brake assembly of claim 1, wherein the pair of rear wheel assemblies are casters.

3. The brake assembly of claim 1, wherein the pair of actuators are gas springs.

4. The brake assembly of claim 1, wherein rotation of the pedal lever in the other of the first and second directions about the second axis causes the gearbox to rotate the pair of rotatable shafts about the first axis to substantially unlock the pair of rear wheel assemblies, and substantially simultaneously causes a translation of at least a portion of the pair of actuators to deactivate the brake assemblies to substantially unlock the front wheel assemblies.

5. The brake assembly of claim 1, wherein rotation of the pedal lever away from a neutral position in either of the first and second directions about the second axis causes the gearbox to rotate the pair of rotatable shafts about the first axis to substantially lock the pair of rear wheel assemblies, and substantially simultaneously causes a translation of at least a portion of the pair of actuators to actuate the brake assemblies to substantially lock the front wheel assemblies, such that the wheels of the front and rear wheel assemblies brake substantially simultaneously.

6. The brake assembly of claim 5, wherein positioning of the pedal lever in the neutral position about the second axis causes the gearbox to rotate the pair of rotatable shafts about the first axis to substantially unlock the pair of rear wheel assemblies, and substantially simultaneously causes a translation of at least a portion of the pair of actuators to deactivate the brake assemblies to substantially unlock the front wheel assemblies.

7. The brake assembly of claim 1, wherein each of the pair of actuators couples to one of the pair of rotatable shafts via a linkage movably coupled to a lever that is rotatably fixed to the rotatable shaft.

8. The brake assembly of claim 1, wherein each of the pair of actuators couples to one of the brake assemblies via a linkage coupled to a movable lever of the brake assembly, wherein the lever is movable by the actuator between a first position where the brake assembly does not inhibit rotation of the front wheel and a second position where the brake assembly applies a braking force on the front wheel.

9. The brake assembly of claim 1, further comprising a pair of rotary detents disposed on opposite sides of the gearbox, the rotary detents configured to engage a spring assembly to exert a force on the rotatable shafts to inhibit their rotation unless the pedal lever is actuated.

10. The brake assembly of claim 1, wherein the pedal lever is configured to rotate over a range of approximately 60 degrees.

11. The brake assembly of claim 1, further comprising a baseplate configured to support the pair of rear wheel assemblies, the pair of front wheel assemblies, and the gearbox.

12. A brake assembly for a robotic surgery cart, comprising:
a pair of rear wheel assemblies, each having a brake mechanism actuatable to selectively brake a wheel of each of the rear wheel assemblies;
at least one front wheel assembly;
a brake assembly actuatable to selectively brake the at least one front wheel assembly;
a gearbox interposed between the pair of rear wheels;
a pair of rotatable shafts extending along a first axis and interconnecting the gearbox with the pair of rear wheels;
at least one actuator interconnecting at least one of the pair of rotatable shafts and the brake assembly; and
a pedal lever rotatably coupled to the gearbox and configured to rotate about a second axis different than the first axis, the pedal lever configured to rotate in a first direction about the second axis and to rotate in a second direction opposite to the first direction about the second axis,
wherein rotation of the pedal lever in one of the first direction and the second direction about the second axis causes the gearbox to rotate the pair of rotatable shafts about the first axis to substantially lock the pair of rear wheel assemblies, and substantially simultaneously causes a translation of the at least one elongate actuator to actuate the brake assembly to substantially lock the front wheel assembly, such that the rear wheel assemblies and the at least one front wheel assembly brake substantially simultaneously.

13. The brake assembly of claim 12, wherein the pair of rear wheel assemblies are casters.

14. The brake assembly of claim 12, wherein the at least one actuator is a pair of elongate actuators that extend between and interconnect the pair of rotatable shafts and a pair of brake assemblies.

15. The brake assembly of claim 12, wherein the at least one actuator is a gas spring.

16. The brake assembly of claim 12, wherein rotation of the pedal lever in the other of the first and second directions about the second axis causes the gearbox to rotate the pair of rotatable shafts about the first axis to substantially unlock the pair of rear wheel assemblies, and substantially simultaneously causes a translation of at least a portion of the pair of actuators to deactivate the brake assemblies to substantially unlock the front wheel assemblies.

17. The brake assembly of claim 12, wherein rotation of the pedal lever away from a neutral position in either of the first and second directions about the second axis causes the gearbox to rotate the pair of rotatable shafts about the first axis to substantially lock the pair of rear wheel assemblies, and substantially simultaneously causes a translation of at least a portion of the pair of actuators to actuate the brake assemblies to substantially lock the front wheel assemblies, such that the wheels of the front and rear wheel assemblies brake substantially simultaneously.

18. The brake assembly of claim 17, wherein positioning of the pedal lever in the neutral position about the second axis causes the gearbox to rotate the pair of rotatable shafts about the first axis to substantially unlock the pair of rear wheel assemblies, and substantially simultaneously causes a translation of at least a portion of the pair of actuators to deactivate the brake assemblies to substantially unlock the front wheel assemblies.

19. The brake assembly of claim 12, wherein the at least one actuator couples to one of the pair of rotatable shafts via a linkage movably coupled to a lever that is rotatably fixed to the rotatable shaft.

20. The brake assembly of claim 12, wherein the at least one actuator couples to the brake assembly via a linkage coupled to a movable lever of the brake assembly, wherein the lever is movable by the actuator between a first position where the brake assembly does not inhibit rotation of the front wheel and a second position where the brake assembly applies a braking force on the front wheel.

21. The brake assembly of claim 12, further comprising a pair of rotary detents disposed on opposite sides of the gearbox, the rotary detents configured to engage a spring assembly to exert a force on the rotatable shafts to inhibit their rotation unless the pedal lever is actuated.

22. The brake assembly of claim 12, wherein the pedal lever is configured to rotate over a range of approximately 60 degrees.

* * * * *